(12) United States Patent
Sabat, Jr. et al.

(10) Patent No.: US 6,349,200 B1
(45) Date of Patent: Feb. 19, 2002

(54) MONITORING AND COMMAND SYSTEM FOR TRANSCEIVERS USED TO INTERCONNECT WIRELESS TELEPHONES TO A BROADBAND NETWORK

(75) Inventors: John Sabat, Jr., Merrimack, NH (US); Timothy R. Locascio, Osterville, MA (US); Clifford M. Lo Verme; Glenn T. Flebotte, both of Merrimack, NH (US)

(73) Assignee: Transcept, Inc., Manchester, NH (US)

( * ) Notice: Subject to any disclaimer, the term of this patent is extended or adjusted under 35 U.S.C. 154(b) by 0 days.

(21) Appl. No.: 09/346,590

(22) Filed: Jul. 2, 1999

Related U.S. Application Data

(63) Continuation of application No. 08/998,878, filed on Dec. 24, 1997.

(51) Int. Cl.[7] .......................... H04O 7/20; H04M 11/00
(52) U.S. Cl. ...................... 455/403; 455/420; 455/507; 455/525; 455/422; 455/88; 455/9; 370/338; 370/349
(58) Field of Search ................................. 455/525, 524, 455/500, 422, 507, 9, 403, 3.03, 88; 370/338, 339, 349; 348/12, 14

(56) References Cited

U.S. PATENT DOCUMENTS

| | | | |
|---|---|---|---|
| 4,584,678 A | * | 4/1986 | Ozeki et al. ................... 370/85 |
| 4,587,651 A | * | 5/1986 | Nelson et al. ................ 370/88 |
| 4,593,155 A | * | 6/1986 | Hawkins ........................ 179/2 |
| 5,067,147 A | * | 11/1991 | Lee .............................. 379/60 |
| 5,305,467 A | | 4/1994 | Herndon et al. |
| 5,381,459 A | | 1/1995 | Lappington |
| 5,550,898 A | | 8/1996 | Abbasi et al. |
| 5,802,173 A | | 9/1998 | Hamilton-Piercy et al. |
| 5,805,983 A | | 9/1998 | Naidu et al. |
| 5,809,395 A | | 9/1998 | Hamilton-Piercy et al. |
| 5,881,059 A | | 3/1999 | Deschaine et al. |
| 5,898,683 A | | 4/1999 | Matsumoto et al. |
| 6,122,529 A | * | 9/2000 | Sabat, Jr. et al. ........... 455/561 |
| 6,192,216 B1 | * | 2/2001 | Sabat, Jr. et al. ........... 455/5.1 |
| 6,223,021 B1 | * | 4/2001 | Sylvia et al. ................. 455/77 |

* cited by examiner

Primary Examiner—William Trost
Assistant Examiner—Marleen Milord
(74) Attorney, Agent, or Firm—Kirkpatrick & Lockhart LLP

(57) ABSTRACT

A monitoring and command system for use in a wireless communications system including remotely located transceivers for transmitting and receiving telephony signals to and from wireless telephones wherein each of the remote transceivers is connected to a broadband distribution network. A central location includes remote antenna signal processors connected to the broadband distribution network and a control unit is connected to the remote antenna signal processor, and the monitoring and command system controls operations of the remote antenna signal processors and the remote transceivers. The control unit exchanges control and monitoring messages with the remote antenna signal processors, and each exchange of messages comprises a completed exchange of messages with one remote antenna signal processor before initiation of an exchange of messages with another remote antenna signal processor. Each remote antenna signal processor exchanges control and monitoring messages with the remote transceivers associated therewith, and the messages to all associated remote transceivers are interspersed. Each control and monitoring message includes a message number field identifying the meaning of the message, a unique message tag field used by the remote antenna signal processors to identify each remote transceivers, and a plurality of data fields containing message information wherein the contents of each data field are defined by the contents of the message number field.

4 Claims, 13 Drawing Sheets

| MSG# HEX | MSG# DEC | Message Name | Usage | Page |
|---|---|---|---|---|
| 0x00 | 0 | MSG_FAIL | S | 4 |
| 0x01 | 1 | ALARM_STATUS_REQUEST_MSG | S | 4 |
| 0x02 | 2 | ADD_HIC_MSG | S, ATP | 5 |
| 0x03 | 3 | HIC_DS_OUTPUT_POWER_MSG | S, ATP | 6 |
| 0x04 | 4 | HIC_US_POWER_CTL_MSG | S, ATP | 6 |
| 0x05 | 5 | HIC_SET_ALARM_MSG | S, ATP | 7 |
| 0x06 | 6 | ADD_CMI_MSG | S, ATP | 8 |
| 0x07 | 7 | ACT_CMI_MSG | S, ATP | 9 |
| 0x08 | 8 | CMI_US_ATT_MSG | S, ATP | 10 |
| 0x09 | 9 | CMI_DS_ATT_MSG | S, ATP | 10 |
| 0x0A | 10 | CMI_SET_ALARM_MSG | S, ATP | 10 |
| 0x0B | 11 | CMI_HIC_GAIN_MSG | S, ATP | 11 |
| 0x0C | 12 | HIC_CODE_DL_MSG | S | 12 |
| 0x0D | 13 | HIC_SET_TD_MSG | ATP | 13 |
| 0x0E | 14 | HIC_SET_CAL_MSG | ATP | 13 |
| 0x0F | 15 | CMI_CODE_DL_MSG | S, ATP | 14 |
| 0x10 | 16 | CMI_SET_TD_MSG | ATP | 14 |
| 0x11 | 17 | CMI_SET_CAL_MSG | ATP | 15 |
| 0x12 | 18 | HIC_REPORT_ALARM_MSG | S | 16 |
| 0x13 | 19 | HIC_COMM_STAT_MSG | S | 17 |
| 0x14 | 20 | HIC_ATTENUATION_STAT_MSG | S, ATP | 17 |
| 0x15 | 21 | HIC_FREQUENCY_STAT_MSG | S, ATP | 18 |
| 0x16 | 22 | HIC_POWER_STAT_MSG | S, ATP | 18 |
| 0x17 | 23 | HIC_MISC_STAT_MSG | S, ATP | 19 |
| 0x18 | 24 | HIC_TD_STAT_MSG | ATP | 19 |
| 0x19 | 25 | HIC_READ_CAL_MSG | ATP | 19 |
| 0x1A | 26 | HIC_VER_NUM_MSG | S, ATP | 20 |
| 0x1B | 27 | CMI_COMM_STAT_MSG | S | 20 |
| 0x1C | 28 | CMI_ATT_STAT_MSG | S, ATP | 21 |
| 0x1D | 29 | CMI_REPORT_ALARM_MSG | S | 22 |
| 0x1E | 30 | CMI_FREQ_STAT_MSG | S, ATP | 24 |
| 0x1F | 31 | CMI_POWER_STAT_MSG | S, ATP | 24 |
| 0x20 | 32 | CMI_MISC_STAT_MSG | S, ATP | 25 |
| 0x21 | 33 | CMI_READ_CAL_MSG | ATP | 25 |
| 0x22 | 34 | CMI_READ_TD_MSG | ATP | 26 |
| 0x23 | 35 | CMI_READ_VER_MSG | S, ATP | 26 |
| 0x24 | 36 | HIC_TUNE_PLL_MSG | S | 27 |
| 0x25 | 37 | HIC_POKE_MEM_MSG | TD | 27 |
| 0x26 | 38 | HIC_PEEK_MEM_MSG | TD | 27 |
| 0x27 | 39 | HIC_COPY_TO_EEPROM_MSG | TD | 27 |
| 0x28 | 40 | CMI_TUNE_PLL_MSG | TD | 28 |
| 0x29 | 41 | CMI_POKE_MEM_MSG | TD | 28 |
| 0x2A | 42 | CMI_PEEK_MEM_MSG | TD | 29 |
| 0x2B | 43 | CMI_READ_NID_MSG | TD | 29 |
| 0x2C | 44 | WINK_HIC_MSG | TD | 29 |
| 0x2D | 45 | HIC_UPSTREAM_TONE_POWER | TD | 30 |
| 0x2E | 46 | HIC_FLASH_DAT_WR_MSG | TD | 30 |
| 0x2F | 47 | HIC_FLASH_DAT_RD_MSG | TD | 30 |
| 0x30 | 48 | HIC_FLASH_UNLOC_MSG | TD | 31 |
| 0x31 | 49 | HIC_CAL_MODE_MSG | Not used | 32 |
| 0x32 | 50 | HIC_REBOOT_MSG | ATP | 33 |
| 0x33 | 51 | HIC_MSG_DUMP_MSG | TD | 33 |
| 0x34 | 52 | CMI_US_SETPOINT_MSG | S | 33 |

767 (pointing to row 0x1E)

Usage Legend:
S = Required for normal System operation
ATP = Required by Automated Test Procedure, Hardware Qualification
TD = Test and Debug use only

FIG. 7A

| Message | MSG_FAIL | | This message is a RESPONSE only. If a message failed to be processed by the receiving device, this RESPONSE will be returned. |
|---|---|---|---|
| Msg. Num. | 0x00 | | |
| Msg Tag | Tag number | (7:0) | (0-255) |
| | ******** RESPONSE ******** | | |
| DF # 1 | error type | (7:0) | 1- Poll Neuron Timeout |
| | | | 2- BPSK Demodulator Timeout |
| | | | 3- Multiple Message Error (DF #2-10 indicate the CMIs in which errors were reported) |
| | | | 5- Requested CMI is not online (test only) |
| | If DF # 1 = 3 | | Bit set if CMI didn't respond to msg sent to it |
| DF # 2 | | (7:0) | Alpha CMI, (8-1) Bit-mapped |
| DF # 3 | | (7:0) | Alpha CMI, (16-9) Bit-mapped |
| DF # 4 | | (7:0) | Alpha CMI, (24-17) Bit-mapped |
| DF # 5 | | (7:0) | Beta CMI, (8-1) Bit-mapped |
| DF # 6 | | (7:0) | Beta CMI, (16-9) Bit-mapped |
| DF # 7 | | (7:0) | Beta CM, (24-17) Bit-mapped |
| DF # 8 | | (7:0) | Gamma CMI, (8-1) Bit-mapped |
| DF # 9 | | (7:0) | Gamma CMI, (16-9) Bit-mapped |
| DF # 10 | | (7:0) | Gamma CMI, (24-17) Bit-mapped |

FIG. 7B

| Message | ADD_HIC_MSG | | This message is used at installation, and to change the HIC's State and Channel parameters. |
|---|---|---|---|
| Msg. Num. | 0x02 | | |
| Msg Tag | Tag number | (7:0) | (0-255) |
| | ******** REQUEST ******** | | |
| DF # 1 | hic_state | (0) | 0=Offline, 1=Online |
| | | (1) | Downstream power: 0=off / 1=on |
| | | (2) | Reference tone: 0=off / 1=on |
| | | (3) | Control tone: 0=off / 1=on |
| | | (4) | CMI Data Base: 0=leave alone / 1=clear |
| | | (5) | Power up state: 0=from defaults / 1=from last state |
| | | (7:6) | Channel Type: 0=STD, 1=HRC, 2=IRC |
| DF # 2 | alpha_upstr_pri_freq | (7:0) | Alpha Upstream Primary Freq: (see notes below) |
| DF # 3 | alpha_upstr_div_freq | (7:0) | Alpha Upstream Diversity Freq: (see notes below) |
| DF # 4 | beta_upstr_pri_freq | (7:0) | Beta Upstream Primary Freq: (see notes below) |
| DF # 5 | beta_upstr_div_freq | (7:0) | Beta Upstream Diversity Freq: (see notes below) |
| DF # 6 | gamma_upstr_pri_freq | (7:0) | Gamma Upstream Primary Freq: (see notes below) |
| DF # 7 | gamma_upstr_div_freq | (7:0) | Gamma Upstream Diversity Freq: (see notes below) |
| DF # 8 | dnstr_chan | (7:0) | Downstream Channel: (70-120) |
| | USA Channels | | |
| DF # 9 | indicator | (7:5) | USA Channel indicator (000) |
| | pcs_tx_chan | (4:0) | PCS Channel MSB (0-1) (see notes below) |
| DF # 10 | pcs_tx_chan | (7:0) | PCS Channel LSB (0-255) (see notes below) |
| | Korean FAs | | |
| DF # 9 | indicator | (7:5) | Korean FA indicator (001) |
| | | (4:0) | unused (send zeroes) |
| DF # 10 | pcs_tx_chan | (7:0) | Korean FA (1-21) (see notes below) |

Notes:
When any of the Frequency and Channel parameters are changed, the appropriate values of any attached CMIs will automatically be changed, i.e. an ACT_CMI_MSG with changed data is sent to each attached CMI.
Upstream CATV Frequency:
    5 to 42 MHz in 250 kHz steps, ( I.e. for desired upstream freq of 23.5 MHz (23.5 MHz / .250 MHz) = 94 ), maintain at least 2 MHz between all sectors and channels, Diversity channel 2 MHz min. above its corresponding Primary channel.
United States PCS Channel:
    Band A: Channels 25 to 275, Tx freq = (PCS Chan x .05 MHz ) + 1930 MHz, Rx Freq is 80 MHz below. (i.e. for PCS channel 275 set DF#9 to 1 (256) and DF#10 to 19)
Korean PCS FA:
    Band A: FAs 1 to 7, Tx freq = (PCS FA x 1.25 MHz) + 1840 MHz, Rx Freq is 90 MHz below.
    Band B: FAs 8 to 14, Tx freq = ((PCS FA - 7) x 1.25 MHz) + 1850 MHz, Rx Freq is 90 MHz below.
    Band C: FAs 15 to 21, Tx freq = ((PCS FA - 14) x 1.25 MHz) + 1860 MHz, Rx Freq is 90 MHz below.
Other Countries' PCS channel allocations can be added by assigning DF # 9 bits 7:5. Six possibilities remain (010 - 111)

FIG. 7C

| Message | HIC_DS_OUTPUT_POWER_MSG | | This message is to set up the HIC's downstream attenuators and power control. |
|---|---|---|---|
| Msg. Num. | 0x03 | | |
| Msg Tag | Tag number | (7:0) | (0-255) |
| | ******** REQUEST ******** | | |
| DF # 1 | hic_state | (0) | 0 = Offline / 1 = Online |
| | | (1) | Downstream power: 0=off / 1=on |
| | | (2) | Reference tone: 0=off / 1=on |
| | | (3) | Control tone: 0=off / 1=on |
| | | (4) | CMI Data Base: 0=leave alone / 1=clear |
| | | (5) | Power up state: 0=from defaults / 1=from last state |
| | | (7:6) | Channel Type: 0=STD, 1=HRC, 2=IRC |
| DF # 2 | save to flash | (0) | DS Atten:   0 = don't change / 1 = change |
| | | (1) | Ref/Cntl Atten:   0 = don't change / 1 = change |
| DF # 3 | dnstr_att_value | (7:0) | Downstream attenuator: (0-44) 2 dB steps |
| DF # 4 | ref_ctrl_tone | (7:0) | Ref/Ctrl attenuator: (0-44) 2 dB steps |

FIG. 7D

| Message | HIC_US_POWER_CTL_MSG | | This message is to set up the HIC's upstream attenuators and power control. |
|---|---|---|---|
| Msg. Num. | 0x04 | | |
| Msg Tag | Tag number | (7:0) | (0-255) |
| | ******** REQUEST ******** | | |
| DF # 1 | save to flash | (0) | 0 = don't change / 1 = change   (saves DF#2 - #8) |
| DF # 2 | upstr_alpha_att | (7:0) | fixed value (0-44) 2 dB steps |
| DF # 3 | upstr_beta_att | (7:0) | fixed value (0-44) 2 dB steps |
| DF # 4 | upstr_gamma_att | (7:0) | fixed value (0-44) 2 dB steps |
| DF # 5 | not used | (7:0) | formerly US AGC Alpha setpoint |
| DF # 6 | not used | (7:0) | formerly US AGC Beta setpoint |
| DF # 7 | not used | (7:0) | formerly US AGC Gamma setpoint |
| DF # 8 | ingress_level_threshold | (7:0) | Ingress threshold fixed value (1-10) 0.5 dB steps |

FIG. 7E

| Message | ADD_CMI_MSG | | This message is sent to the HIC at installation of a CMI. The Neuron ID is loaded into the CMI data base within the HIC. If Ping is set (DF#10 MSB) the HIC then builds and sends an ACT_CMI_MSG to the CMI. |
|---|---|---|---|
| Msg. Num. | 0x06 | | |
| Msg Tag | Tag number | (7:0) | (0-255) |
| | ********* REQUEST ********* | | |
| DF # 1 | *sector / cmi_num* | (7:6) | Sector Number: 0=Alpha, 1=Beta, 2=Gamma |
| | | (4:0) | CMI Number: (0-23) |
| DF # 2 | NID5 | (7:0) | Neuron ID MSW |
| DF # 3 | NID4 | (7:0) | Neuron ID |
| DF # 4 | NID3 | (7:0) | Neuron ID |
| DF # 5 | NID2 | (7:0) | Neuron ID |
| DF # 6 | NID1 | (7:0) | Neuron ID |
| DF # 7 | NID0 | (7:0) | Neuron ID LSW |
| DF # 8 | state | (0) | 0 = Not active / 1 = Active |
| | | (1) | Auto stats: 0 = off / 1 = on |
| | | (2) | Dwnstrm autogain: 0 = off / 1 = on |
| | | (3) | Power up state: 0 =from defaults / 1 = from last state |
| | | (4) | CMI alarms: 0 = leave alone / 1 = clear |
| | | (5) | Upstrm autogain: 0 = off / 1 = on |
| DF # 9 | tx_state | (0) | PA: 0 = off / 1 = on |
| | | (1) | Primary Receive: 0 = off / 1 = on |
| | | (2) | Diversity Receive: 0 = off / 1 = on |
| DF # 10 | *ping / gain* | (6:0) | Dwnstrm AGC Setpoint: (HIC input to CMI output) |
| | | (7) | Ping CMI: 0 = yes / 1 = no |

FIG. 7F

| Message | ACT_CMI_MSG | | This message is used at installation and to change the CMI State, CATV and PCS frequencies, Tx state and CMI gain. |
|---|---|---|---|
| Msg. Num. | 0x07 | | |
| Msg Tag | Tag number | (7:0) | (0-255) |
| | ********* REQUEST ********* | | |
| DF # 1 | *sector* / cmi_num | (7:6) | Sector Number: 0=Alpha, 1=Beta, 2=Gamma |
| | | (4:0) | CMI Number: (0-23) |
| DF # 2 | state | (0) | 0 = Not active / 1 = Active |
| | | (1) | Auto stats: 0 = off / 1 = on |
| | | (2) | Dwnstrm autogain: 0 = off / 1 = on |
| | | (3) | Power up state: 0 =from defaults / 1 = from last state |
| | | (4) | CMI alarms: 0 = leave alone / 1 = clear |
| | | (5) | Upstrm autogain: 0 = off / 1 = on |
| DF # 3 | up_pri_freq | (7:0) | Upstream Primary Freq: (see notes below) |
| DF # 4 | up_div_freq | (7:0) | Upstream Diversity Freq: (see notes below) |
| DF # 5 | dn_chn | (7:0) | Downstream Channel: 70 to 120 (see notes below) |
| DF # 6 | dn_chn_type | (1:0) | Downstream Channel Type: 0 = STD, 1 = HRC, 2=IRC (see notes below) |
| | US Channels | | |
| DF # 7 | indicator | (7:5) | US Channel indicator (000) |
| | pcs_tx_chan | (4:0) | PCS Channel MSB (0-1) (see notes below) |
| DF # 8 | pcs_tx_chan | (7:0) | PCS Channel LSB (0-255) (see notes below) |
| | Korean FAs | | |
| DF # 7 | indicator | (7:5) | Korean FA indicator (001) |
| | | (4:0) | unused (send zeroes) |
| DF # 8 | pcs_tx_chan | (7:0) | Korean FA (1-21) (see notes below) |
| DF # 9 | tx_state | (0) | PA: 0 = off / 1 = on |
| | | (1) | Primary Receive: 0 = off / 1 = on |
| | | (2) | Diversity Receive: 0 = off / 1 = on |
| DF # 10 | gain | (6:0) | Dwnstrm AGC Setpoint: (HIC input to CMI output) |

Note:
    If a CMI is attached to a HIC, it is then necessary to match all the Frequency and Channel parameters to the current values of the HIC.

Upstream CATV Frequency:
    5 to 42 MHz in 250 kHz steps, ( i.e. for desired upstream freq of 23.5 MHz (23.5 MHz / .250 MHz) = 94 ) Diversity channel 2 MHz min. above its corresponding Primary channel.

PCS Channel:
    Band A: Channels 25 to 275, Tx freq = (PCS Chan x .05 MHz ) + 1930 MHz, Rx Freq is 80 MHz below. (i.e. for PCS channel 275 set DF#9 to 1 (256) and DF#10 to 19)

Korean PCS FA:
    Band A: FAs 1 to 7, Tx freq =   (PCS FA x 1.25 MHz)   + 1840 MHz, Rx Freq is 90 MHz below.
    Band B: FAs 8 to 14, Tx freq = ((PCS FA - 7) x 1.25 MHz) + 1850 MHz, Rx Freq is 90 MHz below.
    Band C: FAs 15 to 21, Tx freq = ((PCS FA - 14) x 1.25 MHz) + 1860 MHz, Rx Freq is 90 MHz below.

FIG. 7G

| Message | CMI_HIC_GAIN_MSG | | This message is used by the HIC for the auto gain function. The message data is different from HIC to CMI, than it is from CMI to HIC. |
|---|---|---|---|
| Msg. Num. | 0x0B | | |
| Msg Tag | Tag number | (7:0) | (0-255) |
| | ******** HIC to CMI ********* | | |
| DF # 1 | enumerator | (7:0) | 0, >5 = Turn Gain Tone off |
| | | | 1 = Tell CMI to calculate average power amp value |
| | | | 2,3 = Turn Gain Tones on |
| | | | 4 = set the US and DS attenuators |
| | | | 5 = Turn Gain Tone off, set US attenuators, turn on/off PA and Rcvrs, Tune PCS channel and save it to flash. |
| DF # 2 | time | (7:0) | Gain time  (enum = 1) |
| DF # 3 | freq | (7:0) | Gain tone Freq MSB  ( enum = 2 or 3, see notes below) |
| DF # 4 | freq | (7:0) | Gain tone Freq LSB   (enum = 2 or 3, see notes below) |
| DF # 5 | sector / cmi_num | (7:0) | Sector Number  0=Alpha, 1=Beta, 2=Gamma CMI Number (0-23) |
| DF # 6 | up_pri_att | (7:0) | Upstream Primary Attenuation   (enum = 4,5) |
| DF # 7 | up_div_att | (7:0) | Upstream Diversity Attenuation   (enum = 4,5) |
| DF # 8 | up_com_att | (7:0) | Upstream Combined Attenuation   (enum = 4,5) |
| DF # 9 | dn_pre_att | (7:0) | Downstream Attenuation pre SAW   (enum = 4) |
| DF # 10 | dn_pos_att | (7:0) | Downstream Attenuation post SAW    (enum = 4) |
| DF # 3 | freq | (7:0) | PCS Channel MSB  (enum = 5, see notes below) |
| DF # 4 | freq | (7:0) | PCS Channel LSB  (enum = 5) |
| DF # 9 | tx_state (see note below) | (0) | PA:  0 = off / 1 = on   (enum = 5) |
| | | (1) | Primary Receive:  0 = off / 1 = on   (enum = 5) |
| | | (2) | Diversity Receive:  0 = off / 1 = on    (enum = 5) |
| | ******** CMI to HIC ******** | | enum=0,2,3,4,>5 (see note below) |
| DF # 1 | pa_tx_pwr | (7:0) | Power Amp Transmit Power |
| DF # 2 | tone_pwr | (7:0) | Gain Tone power |
| DF # 3 | up_pwr | (7:0) | Upstream power |
| DF # 4 | pri_cal_fac | (7:0) | Primary cal factor |
| DF # 5 | div_cal_fac | (7:0) | Diversity cal factor |
| DF # 6 | up_pri_att | (7:0) | Upstream Primary Attenuation |
| DF # 7 | up_div_att | (7:0) | Upstream Diversity Attenuation |
| DF # 8 | up_com_att | (7:0) | Upstream Combined Attenuation |
| DF # 9 | dn_pre_att | (7:0) | Down stream Attenuation pre SAW |
| DF # 10 | dn_pos_att | (7:0) | Down stream Attenuation post SAW |

Notes:
Gain tone frequency: (enum = 2 or 3)
GainFreq =  (int(PCS Chan / 3] x 3) - 7;   i.e. If PCS Channel equals 100, then (int[100 / 3] x 3) - 7 = 92
Puts the gain tones at approx. 350 to 450 kHz above the center of the upstream CATV pedestals.
For enum=1 & 5, CMI echoes back the HIC to CMI message data.
For enum=5, DF#9 affects PA and Receivers, but tx_state is NOT CHANGED to reflect what this message has done. This is part of a gain tone calibration procedure that is not used.

FIG. 7H

MONITORING AND COMMAND SYSTEM FOR TRANSCEIVERS USED TO INTERCONNECT WIRELESS TELEPHONES TO A BROADBAND NETWORK

RELATED APPLICATIONS

This is a continuation of U.S. patent application Ser. No. 08/998,878 filed Dec. 24, 1997.

FIELD OF THE INVENTION

The present invention relates to wireless communications systems, and more particularly to a monitoring and command system for transceivers that carry telephony signals between wireless telephones and a broadband distribution network.

BACKGROUND OF THE INVENTION

The prior art teaches the use of existing cable television network cables to carry telephony signals between a telephone network and remote transceiver sites in defined cells or sectors. The remote transceivers are used to establish wireless telephony communication links with wireless telephones that are operating within an area covered by each remote transceiver. To increase the number of wireless telephone subscribers that can use the wireless telephone system it has been suggested to decrease the size and operational range of each cell or sector, and to increase the number of cells or sectors required to provide wireless telephone service to a given area. Having cells or sectors of decreased size permits greater reuse of the limited number of frequency channels allocated for wireless telephone service because other cells or sectors located at a closer range can reuse the same frequency channels for additional calls without signal interference. The advantages of reducing cell or sector size to increase the call carrying capacity of the wireless telephone network is offset by the requirement for additional remote transceivers for the additional cells. This offset is minimized by utilizing an existing broadband distribution network to provide the communications path between remote transceivers in each of the cells or sectors and a central transceiver. The central transceiver acts as the interface with the remote transceivers, via the broadband distribution network, and a base transceiver station acts as the interface between the telephone network and the central transceivers.

To carry wireless telephony signals over a broadband distribution network, as described above, a predetermined bandwidth on the network is typically allocated for this purpose. However, as required, more bandwidth may be allocated to carry wireless telephony signals. To most efficiently use a given bandwidth to carry wireless telephony signals between wireless telephones and the telephone network, a combination of frequency and time division multiplexing, and other forms of signal multiplexing, is utilized. This requires base transceiver station equipment that acts as the interface with the telephone network and the wireless telephone system. With the base transceiver station equipment is a central transceiver (RASP), also called a Headend Interface Converter (HIC), that interfaces with the broadband distribution network, and it must function with telephony signals in the wide frequency spectrum of radio frequency signals on the telephone network, and up to 1000 Mhz over the broadband distribution network. This system also requires a plurality of remote transceivers, also called cable microcell integrators (CMI) or Remote Antenna Drivers (RADs), in each of the cells or sectors that can carry many channels of telephony signals between the wireless telephones and the central transceiver via the broadband distribution network, without creating signal interference with the telephony signals in adjacent cells or sectors. In addition, the remote transceivers (RADs) must function with and translate telephony signals in the wide frequency spectrums of up to 1000 Mhz on the broadband distribution network and between 1850–1990 MHz for the radio link between remote transceivers and wireless telephones. To function together properly in such a system wireless telephone system there is a need for efficient operational communication between the central transceiver and remote transceivers.

SUMMARY OF THE INVENTION

Thus, there is a need in the art for means to monitor and control the operations of the central transceiver and remote transceivers. In this respect, a recurring problem of the prior art is the creation of a flexible and reliable means for encoding data and commands to be received from and transmitted to the remote transceivers, for receiving information from the remote transceivers, for monitoring the operation of the transceivers, and for sending commands to the remote transceivers to control their operation. It is necessary for the encoding means to convey data and commands in as flexible and compact a form as possible to preserve communications bandwidth and thereby to allow a large number of remote transceivers to be monitored and controlled from each base station, and it is preferable that the encoding allow a flexible a network configuration as possible.

The present invention is directed to a monitoring and command system for use in a wireless communications system including at least one central transceiver and a plurality of remote transceivers used for transmitting and receiving telephony signals to and from wireless telephones.

According to the present invention, each of the remote transceivers (RADs) are connected to a broadband distribution network that carries telephony signals between the remote transceivers (RADs) and the central transceiver (RASP). The central transceiver includes at least one remote antenna signal processor (RASP) connected to the broadband distribution network and a control unit connected to the at least one remote antenna signal processor, and the monitoring and command system controls operations of the remote antenna signal processor and the remote transceivers.

The monitoring and command system includes the control unit, which exchanges messages with each of the remote antenna signal processors for controlling operations of the remote antenna signal processors, including monitoring the operation of the antenna signal processors and the central and remote transceivers, and controlling signal levels and frequencies of the telephony signals. Each exchange of messages between the control unit and a remote antenna signal processor comprises a completed exchange of messages between the control unit and the remote antenna signal processor before initiation of an exchange of messages between the control unit and a next remote antenna signal processor.

The monitoring and command system further includes the at least one antenna signal processor, which exchanges messages with the remote transceivers for controlling operations of each of the remote transceivers, including monitoring operations of each of the remote transceivers, relaying messages between the control unit and each one of the remote transceivers, and controlling the signal levels and frequencies of the telephony signals. The messages of an exchange of messages between the at least one remote antenna signal processor and a selected one of the remote transceivers are interspersed with the messages of an exchange of messages between the at least one remote antenna signal processor and at least one other of the remote transceivers.

The messages exchanged among the control unit, the remote signal signal processors and the central and remote transceivers includes a message number field containing a value identifying the meaning of the message, a message tag field containing a value identifying a given message in a sequence of messages, wherein the message tag field is used in an exchange of messages between a remote antenna signal processor and a remote transceiver, and a plurality of data fields containing message information wherein the contents of each data field are defined by the contents of the message number field. The data fields contain information including an identification of a remote transceiver intended as a recipient of a message, information determining the operating parameters of the remote transceivers, and information pertaining to the status and operation of the remote transceivers.

DESCRIPTION OF THE DRAWINGS

The invention will be better understood upon reading the following Detailed Description in conjunction with the drawings in which:

FIGS. 7A through 7H are illustrations of messages used by the communication and control encoding system of the present invention.

DETAILED DESCRIPTION

Figure 1:
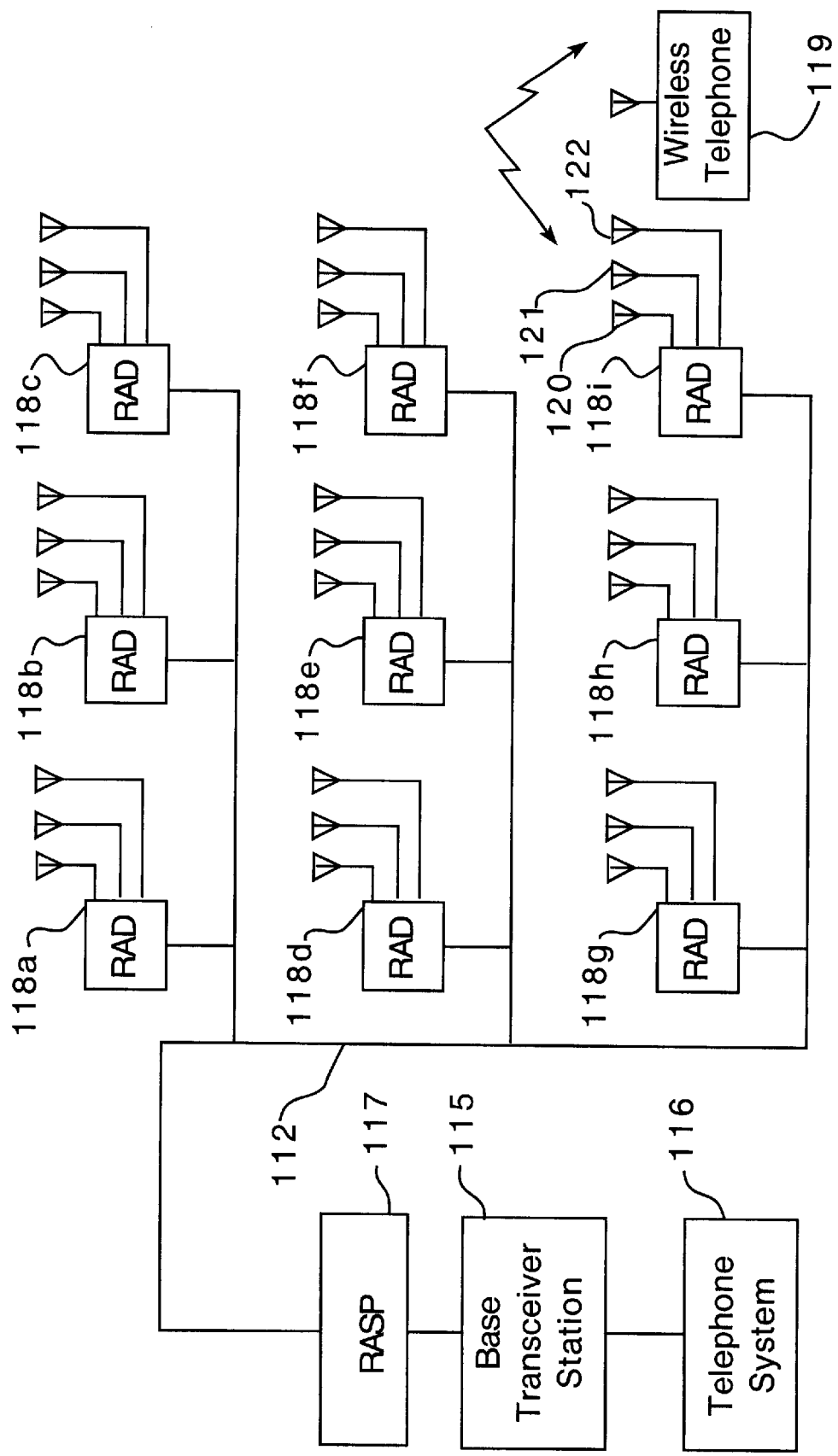
FIG. 1 is a block diagram of a wireless telephony system integrated with a broadband distribution network.

In the drawing and the following detailed description all elements are assigned three digit reference numbers. The first digit of each reference number indicates in which figure of the drawing an element is located. The second and third digits of each reference number indicate specific elements. If the same element appears in more than one figure of the drawing, the second and third digits remain the same and only the first digit changes to indicate the figure of the drawing in which the element is located. As used herein the term "telephony signals" includes voice, data, fax and any other types of signals that are sent over a telephone network now or in the future. Throughout the Figures and the following description, reference is made, for one example, to a combined band pass filter and amplifier 325a. There are a number of other such combined band pass filters and amplifiers. They are shown and referenced this way for ease of presentation only. In reality they are each a discrete, separate filter the output of which is input to an amplifier.

In FIG. 1 is shown a simple block diagram of an exemplary broadband distribution network 112 integrated with a wireless telephone system which include a plurality of remote transceivers known as Remote Antenna Drivers (RAD) 118 a–i, a central transceiver known as Remote Antenna Signal Processor (RASP) 117, and a Base Transceiver Station (BTS) 115. There are different types of broadband distribution networks in use. Such networks may utilize coaxial cable, fiber optic cable, microwave links, and a combination of these. In the embodiment of the invention disclosed herein a conventional hybrid fiber coaxial (HFC) cable television signal distribution system is utilized. Electrical power is distributed along broadband distribution network 112 to power line amplifiers (not shown) of the cable television distribution network. This electrical power source, or alternate power sources, are used to provide power to RADs 118 a–i.

Integrated with broadband distribution network 112 is a wireless telephony system in which the present invention is utilized. One such wireless telephony system is taught in U.S. patent application Ser. No. 08/695,175, filed Aug 1, 1996, and entitled "Apparatus And Method For Distributing Wireless Communications Signals To Remote Cellular Antennas". The telephony system disclosed herein includes a base transceiver station 115 which is connected to a telephone system 116. Base transceiver station 115 is also connected to a Remote Antenna Signal Processor (RASP) 117 which is the interface to a broadband distribution network 112. Telephony signals carried between telephone system 116 and wireless telephones 119 are carried via base transceiver station 115, RASP 117, broadband network 112, and RADs 118 a–i.

As is known in the prior art, including the above cited prior patent application, one or more frequency bands or channels of the broadband distribution network 112 are reserved to carry telephony signals between telephone system 116 and wireless telephones 119. Telephony signals originating from telephone system 116 are transmitted by RASP 117 over broadband distribution network 112 in frequency division multiplexing format. Telephony signals originating at wireless telephones 119 are frequency multiplexed together by RADs 118 a–i and transmitted along with control and gain tones via broadband network 112 to RASP 117, and thence to base transceiver station 115 and telephone system 116.

In base transceiver station 115 there are a plurality of transceiver modules (not shown), as is known in the wireless telephony art, each of which operates at a single channel frequency at a time, and which can handle a predetermined maximum number of telephone calls from wireless telephones. In the wireless telephone system described and claimed herein, the frequency that the RADs 118 are assigned to operate at must correspond to the operating frequency of the assigned BTS transceiver module and are set by control signals received from RASP 117 and base transceiver station 115. If a particular RAD 118 is re-assigned to function with a different transceiver module within base transceiver station 115, circuit settings within the particular RAD 118 must be changed to function with the different transceiver module. In the wireless telephony, art transceiver modules in the base transceiver station are also referred to as channel card modules and radio modules.

When wireless telephony traffic in a first sector or cell increases to the point where adequate service is not provided to wireless telephone subscribers in the first sector or cell, like during rush hour traffic on a highway, in accordance with the teaching of the present invention the wireless telephone system may be remotely reconfigured by RASP 117 to reassign one or more RADs 118 from one or more nearby sectors or cells, where those RADs 118 have overlapping signal coverage with the first sector or cell, to handle the excess wireless telephony traffic in the first sector cell.

In FIG. 1 are shown three rows of RADs 118. Typically a number of RADs 118 are spaced along, and connected to, broadband distribution network 112 to provide overlapping signal transmission and reception coverage for the entire wireless telephone system. Some of the RADs 118 are physically located near the boundary between two or more cells or sectors and, depending on the frequency of operation they are set to, can be used to handle wireless telephony traffic in one or more of the sectors or cells. Let us assume that RADs 118 $g,h,i$ in the bottom row are physically located along broadband distribution system 112 and are configured to handle wireless telephony traffic in a first sector that includes a highway. During early morning and late afternoon every work day there is rush hour traffic that creates peak wireless telephone traffic that causes unacceptable service delays in the first sector. Let us also assume that the RADs 118 $d,e,f$ in the middle row in FIG. 1 are configured and located to handle wireless telephone traffic in a second, adjacent sector but they each have an area of signal operation that overlaps the highway in the first sector.

One or more of RADs 118 $d,e,f$ may be dynamically reassigned by RASP 117 to the first sector to handle the increased telephony traffic originating from the highway. In addition, as necessary, additional RASP 117 channels may be assigned, and additional modules in base transceiver station 115 may be assigned to handle the excess wireless telephony traffic from the first sector. To do this RASP 117 sends control signals to the selected remote RADs $d,e,f$ which will cause the frequency at which they operate to be changed to match the frequency of RADS 118 $g,h,i$ that are normally assigned to handle wireless telephone traffic in the first sector. At the end of the peak traffic period RASP 117 may send control signals to the previously reallocated ones of RADs 118 $d,e,f$ to change the frequency at which they operate back to their original settings so they are reassigned to handle wireless telephony traffic in the second sector. However, the re-assignment may be permanent depending on traffic patterns encountered.

Typically there are a number of RADs 118 $a-i$ spaced along, and connected to, broadband distribution network 112 to provide overlapping wireless telephony signal transmission and reception coverage for the entire wireless telephone system in a number of cells or sectors. In this arrangement individual RADs 118 may be re-assigned to handle wireless telephony signals from an adjacent cell or sector with which it provides overlapping signal coverage. Each RAD 118 $a-i$ has antennas 120, 121, 122 used to transmit to and receive signals from remote wireless telephones 119. Antenna 120 is used to transmit telephony signals to wireless telephones 119, while antennas 121 and 122 are used to receive telephony signals from wireless telephones 119. Antenna 121 is called the primary antenna, and antenna 122 is called the diversity antenna. Antennas 121 and 122 are physically spaced and cooperate to minimize signal fading and thereby provide continuous signal reception from wireless telephones 119.

Figure 2:
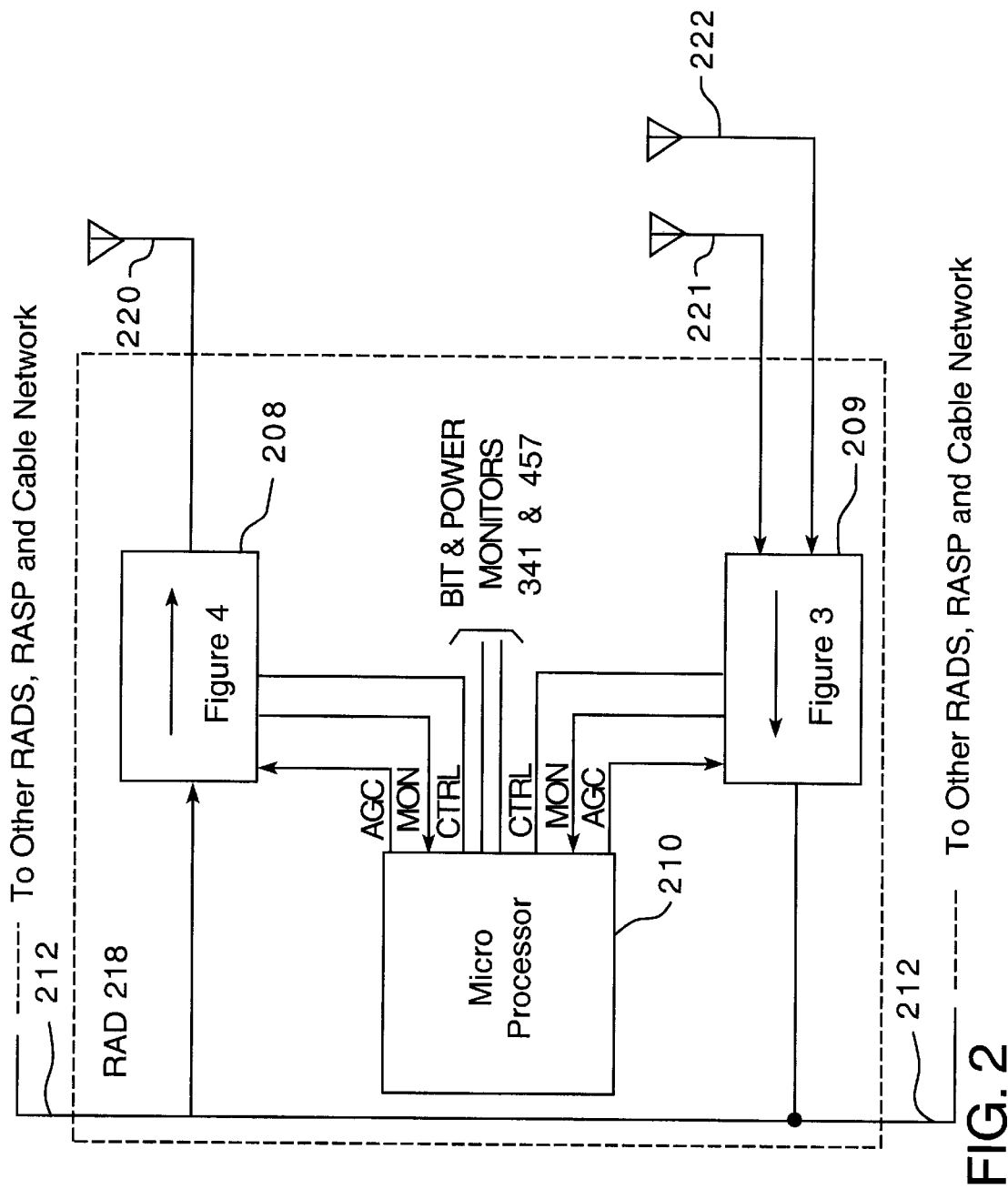
FIG. 2 is a simplified block diagram of a remote transceiver used with the wireless telephony system, and having a microprocessor that communicates with a central transceiver via a broadband distribution network to carry telephony signals and control signals between the wireless telephones and the central transceiver.

In FIG. 2 is shown a general block diagram of a Remote Antenna Driver (RAD) 218. There is a first circuit 208 of RAD 218, that is shown in detail in FIG. 4, that receives telephony signals originating at telephone system 116 and carried via base transceiver station 115, RASP 117, and broadband distribution network 212, and then re-transmitted via antenna 220 of a RAD 118 to a wireless telephone 119 (not shown). There is also a second circuit 209 of RAD 218, that is shown in detail in FIG. 3, that receives wireless telephony signals originating from a wireless telephone 119, and transmits them via broadband network 212 to RASP 117, and via base transceiver station 115 to telephone system 116.

RAD circuitry 208 and 209 are connected to and controlled by a microprocessor 210.

Frequency multiplexed with the wireless telephony signals carried between RASP 117 and RAD 218 are operational signals of different types that are used for controlling the operation of each RAD 218 per the teaching of the present invention. These operations include circuit monitoring, gain control, circuit operation, and setting the frequency of operation, of each RAD 218.

The first of the control operations listed in the previous paragraph is gain control to compensate for losses and gains in a RAD 218 and broadband distribution network 112. As one part of this gain control operation RASP 117 sends a frequency multiplexed control signal to RAD 218 that is received by microprocessor 210 on leads CTRL from circuit 208. Responsive thereto microprocessor 210 sends a signal via leads AGC to circuit 209 which causes the output of a gain tone oscillator 342, with known signal level, to be inserted into the signal path, along with telephony signals, and be returned to RASP 117 via broadband distribution network 112. The signal level output from gain control oscillator 342 (FIG. 3) is of a low enough amplitude that it does not interfere with telephony signals passing through RAD 218, but is separated from the telephony signals at RASP 117. RASP 117 analyzes the amplitude of the gain control oscillator 342 signal received at the RASP, which will reflect gains and losses in RAD 218 and broadband distribution network 212, as part of a determination whether or not to change gain control attenuators in RAD 218.

As part of monitoring circuit gain levels, as requested by a control signal received from RASP 117, microprocessor 210 receives information from RAD circuits 208 and 209 on leads MON indicating the gain level of signals only within these circuits, and reports this information to RASP 117 as described in the last paragraph. Using this circuit gain level information, and the gain tone information described in the previous paragraph, RASP 117 can determine gains and losses introduced in broadband distribution network 212.

Responsive to the gain level information described in the previous two paragraphs RASP 117 can send other control signals back to RAD 218, in accordance with the teaching of the present invention, which are received by microprocessor 210 on leads CTRL. Microprocessor 210 uses the control information received from RASP 117 to send signals via leads AGC to RAD circuits 208 and 209 which results in adjustments being made to attenuators to adjust the signal gain levels in these circuits.

Figure 3:
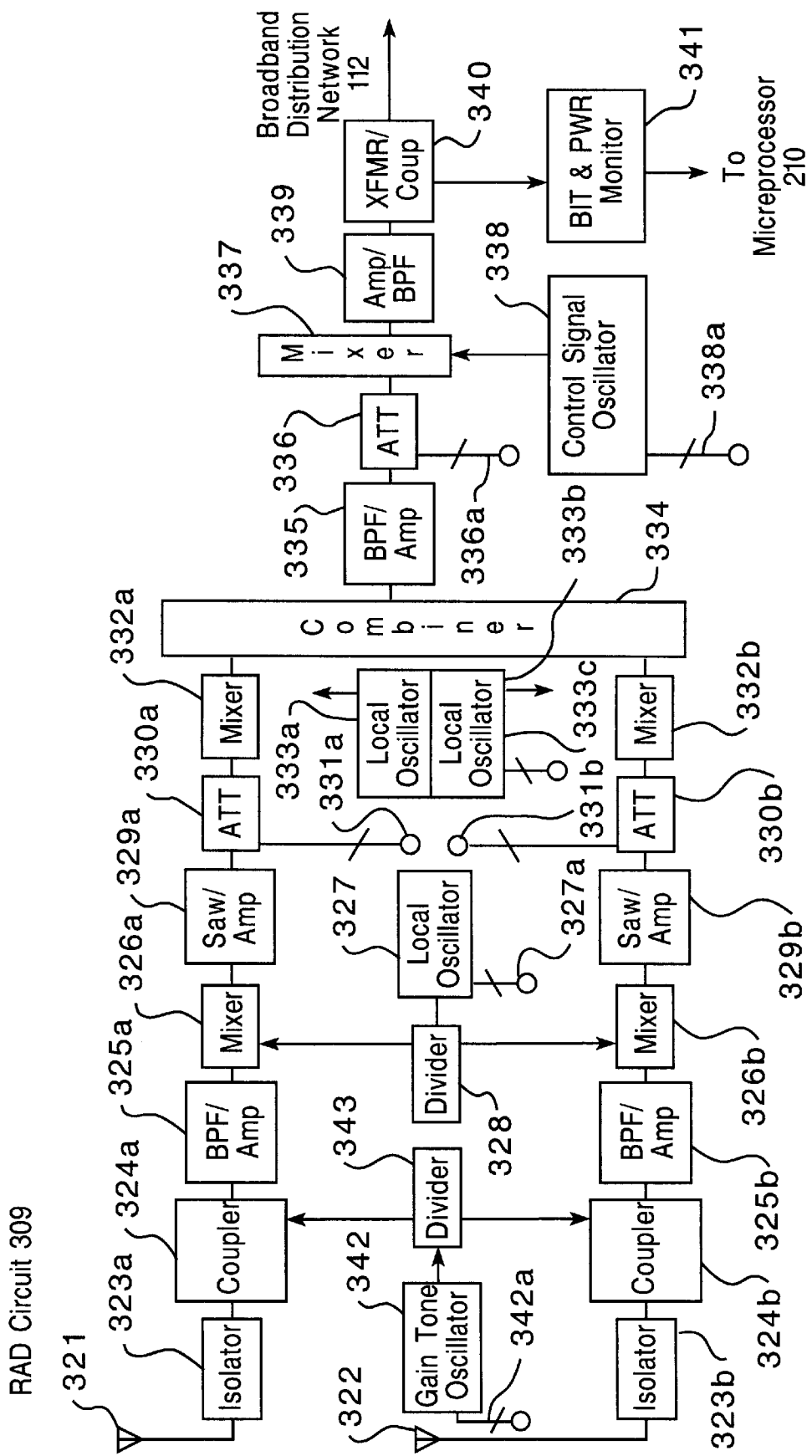
FIG. 3 is a detailed block diagram of the portion of the remote transceiver that transmits to wireless telephones, wireless telephony signals received via a broadband distribution network from the central transceiver, base transceiver station, and telephone network.

RAD 218 receives an interrogation control signal, as previously described, which cause microprocessor 210 to send back information about RAD circuit 208 (FIG. 4) and circuit 209 (FIG. 3). This information indicates the settings of attenuator pads, the temperature at which each RAD 218 is operating, and the frequency of local oscillators within RAD circuits 208 and 209.

Microprocessor 210 may receive other control signals from RASP 117, in accordance with the teaching of the present invention, and respond thereto to change the frequency of some of the local oscillators within RAD circuitry 208 and 209 to change the frequency on which telephony signals and control signals are carried over broadband distribution network 112 to and from RASP 117. In this manner the sector which each RAD 118 is assigned to may be changed to handle peak traffic loads and for other reasons.

In FIG. 3 is shown a detailed block diagram of circuit 309 within Remote Antenna Driver (RAD) 118 that carries telephony signals from a wireless telephone 119, via broadband communications network 112, to central transceiver RASP 117. This is the circuit shown as RAD circuit 209 in FIG. 2.

Briefly, primary receive antenna 321 is connected to a first portion of the circuitry in FIG. 3, and that circuitry is identical to a second portion of the circuitry that is connected to diversity receive antenna 322. The telephony signals received by both antennas 321 and 322 from a wireless telephone 119 (not shown in FIG. 3) are initially processed in parallel, then the two signals are frequency multiplexed together and are both returned via broadband distribution network 112 (shown in FIG. 1) to remote RASP 117 and base transceiver station 115 (FIG. 1) to be processed.

Built into RAD circuitry 309 in FIG. 3 is circuitry which is enabled by microprocessor 210 in FIG. 2, responsive to a control signal received from remote RASP 117, to provide gain control for the telephony signal as it appears at the input of RASP 117. Further, RASP 117 can send other frequency multiplexed control signals to each RAD 118 which microprocessor 210 responds to and changes the frequency at which RAD 118 transmits and receives telephony signals over broadband distribution network 112 to and from RASP 117, and can also change the frequency at which each RAD 118 communicates with wireless telephones.

Telephony signals from a wireless telephone 119 (not shown in FIG. 3) operating in a sector assigned to one or more RAD 118s are received by primary receive antenna 321. These signals are input to an isolator 333a which isolates antenna 321 from RAD circuit 309. The telephony signal is then input to directional coupler 324a that has a second signal input thereto from power divider 343 which is used for the aforementioned gain control purposes.

The telephony signal (modulated RF carrier) received from remote wireless telephone 119, and the gain tone, low level signal, are applied via directional coupler 324a to a combined band pass filter and amplifier 325a. The signals are amplified and extraneous signals are filtered from the received telephony signal by bandpass filter 325a. The operation just described also applies to isolator 333b, coupler 324b and bandpass filter and amplifier 325b.

The amplified and filtered telephony signal is then input to mixer 326a which is used along with SAW filter 329a primarily to assist in filtering of the spread spectrum, digital telephony signal in accordance with the teaching of present invention. Mixer 326a also has input thereto a signal from local oscillator 327. This signal from local oscillator 327 is input to power divider 328 which applies the signal to both mixers 326a and 326b while providing isolation between these two mixers.

The frequency of local oscillator 327 is digitally controlled and is determined by a binary control word applied to its control input 327a from microprocessor 210 (FIG. 2), responsive to control signals received from RASP 117. Similarly, control signals from remote RASP 117 causes microprocessor 210 to set the frequency of digitally controlled local oscillators 333a and 333b.

The operation of mixer 326a results in multiple frequencies being output from the mixer as is known in the art, but due to the frequency of oscillator 327, most of the signals present at the input of RAD circuit 309 from antenna 321 are shifted far outside the band of frequencies which can pass through SAW filter 329. Only the desired signals can pass through SAW filter 329. This frequency shift also helps to prevent leak through of unwanted signals present at the front end of circuit 309 because they are blocked by narrow bandpass filter 325 which is passing signals of a frequency far from the signals applied to SAW filter 329. Due to the sharp filtering action of SAW filter 329, even spurious signals close to the desired telephony and control tone signals are removed. The same filtering operation applies to mixer 326b and SAW filter 329b.

The filtered telephony signal is then amplified by amplifier 339a and input to step attenuator 330a which is used to adjust the gain level of the signal in one-half dB steps. The amount of attenuation provided by step attenuator 330a is controlled by a binary word at its control input 331a from microprocessor 210. The control of step attenuators 330a, 330b, and 336 is all accomplished responsive to control signals from RASP 117 as part of the gain control operation that assures that the signal level of telephony signals appearing at the input to RASP 117 from all RADs 118 a–i are within an acceptable range. Attenuator 330b in the parallel channel handling the telephony signals from diversity antenna 322 performs the same function.

The telephony signal that is output from step attenuator 330a is input to mixer 332a along with a fixed frequency signal from local oscillator 333a. Mixer 332a is used to shift the frequency of the telephony and gain tone signals to the frequency required to apply the signals to broadband distribution network 112. This same operation applies to the telephony and gain tone signals output from mixer 332b.

The frequency of oscillators 333a and 333b is determined by binary words applied to their control input 333c. A control signal is sent from RASP 117 which causes microprocessor 210 to set the frequency of local oscillators 333a and 333b. The frequency of the telephony signal output from step attenuator 330a is the same as the frequency of the telephony signal output from step attenuator 330b. However, the frequency of local oscillator 333a is different from the frequency of local oscillator 333b. The result is that the carrier frequency of the telephony and gain tone signals output from mixer 332a is different than the carrier frequency of the telephony and gain tone signals output from mixer 332b. This is done so that both primary antenna 321 and diversity antenna 322 signals are both sent to RASP 117 and base transceiver station 115 for processing. However, all carrier frequencies are within the assigned wireless telephony channel on broadband distribution network 112.

The telephony signals received by primary antenna 321 and diversity antenna 322 are frequency multiplexed together and sent via broadband network 112 to RASP 117. To accomplish this, combiner 334 is utilized. Combiner 334 has the telephony and gain tone signals output from both mixers 332a and 332b input thereto. As described in the previous paragraph these two telephony signals modulate carriers that are at different frequencies, but both frequencies are in an assigned channel of broadband distribution network 112. Combiner 334 combines the two sets of signals so they are all frequency multiplexed together.

The combined signal is input to bandpass filter and amplifier 335 which removes spurious frequencies created by the mixing action in circuits 332a and 332b, and amplifies the signals that pass through the filter. The combined and filtered telephony and gain tone signals are input to step attenuator 336 to adjust the gain level of signals. Similar to the operation of the previously described step attenuators, this digitally controlled attenuator is set responsive to control signals received from remote RASP 112 as part of the gain control operation.

The frequency multiplexed telephony and gain tone signals output from step attenuator 336 are input to signal combiner 337 which has a second input from control signal oscillator 338. The frequency of control signal oscillator 338 is set responsive to a binary signal on its control leads 338a from microprocessor 210. RASP 117 is the origin from which the control signal is received to set the frequency of control signal oscillator 338. The frequency chosen is different than the frequencies used for the telephony signals received via the primary and the diversity antennas and for the gain tone signal.

Responsive to different control signals received from RASP 117, microprocessor 210 (FIG. 2) sends signals on control inputs 338a. These microprocessor 210 signals cause control signal oscillator 338 to produce an information signal. The information signal indicates various information about RAD 218, but particularly including the settings of step attenuators 330a, 330b and 336, to RASP 117 as part of the novel gain control operation. RASP 117 uses this information to keep an updated status regarding each of the RADs 118 a–i.

The output from combiner 337 now has five signals frequency multiplexed together to be returned via broadband network 112 to RASP 117. The signals are the telephony signal received by primary antenna 321, the telephony signal received by diversity antenna 322, the gain tone signal output from gain tone oscillator 342 as applied to both primary and diversity paths, and the system information signal output from control signal oscillator 338. This frequency multiplexed signal output from combiner 337 is input to band pass filter and amplifier 339 to remove any extraneous signals and amplify the desired signals before they are input to broadband distribution network 112 and sent to RASP 117.

Transformer and coupler 340 is used to couple the frequency multiplexed signals described in the previous paragraphs to broadband distribution network 112. The transformer is an impedance matching transformer having 50 ohm primary and 75 ohm secondary windings. When broadband distribution network 112 uses coaxial cable, the secondary winding of transformer 340 is wired in series with the center conductor of the video distribution coaxial cable. As previously described, RAD 118 hangs from the coaxial cabling of the broadband distribution network 112 to which it is connected. In other applications, such as with fiber optic cable, other well known frequency conversion and signal coupling techniques are used.

A small portion of the frequency multiplexed signals passing through transformer and coupler 340 is coupled to Built In Test (BIT) and power monitor 341. Monitor 341 samples the signal level of the combined signals that are being input to broadband distribution network 112 and reports this information to RASP 117 via control signal oscillator 338 which has been previously described. If the output signal level is too high and the level cannot be corrected, microprocessor 210 will shut down RAD 118 and report this to RASP 117.

Figure 4:
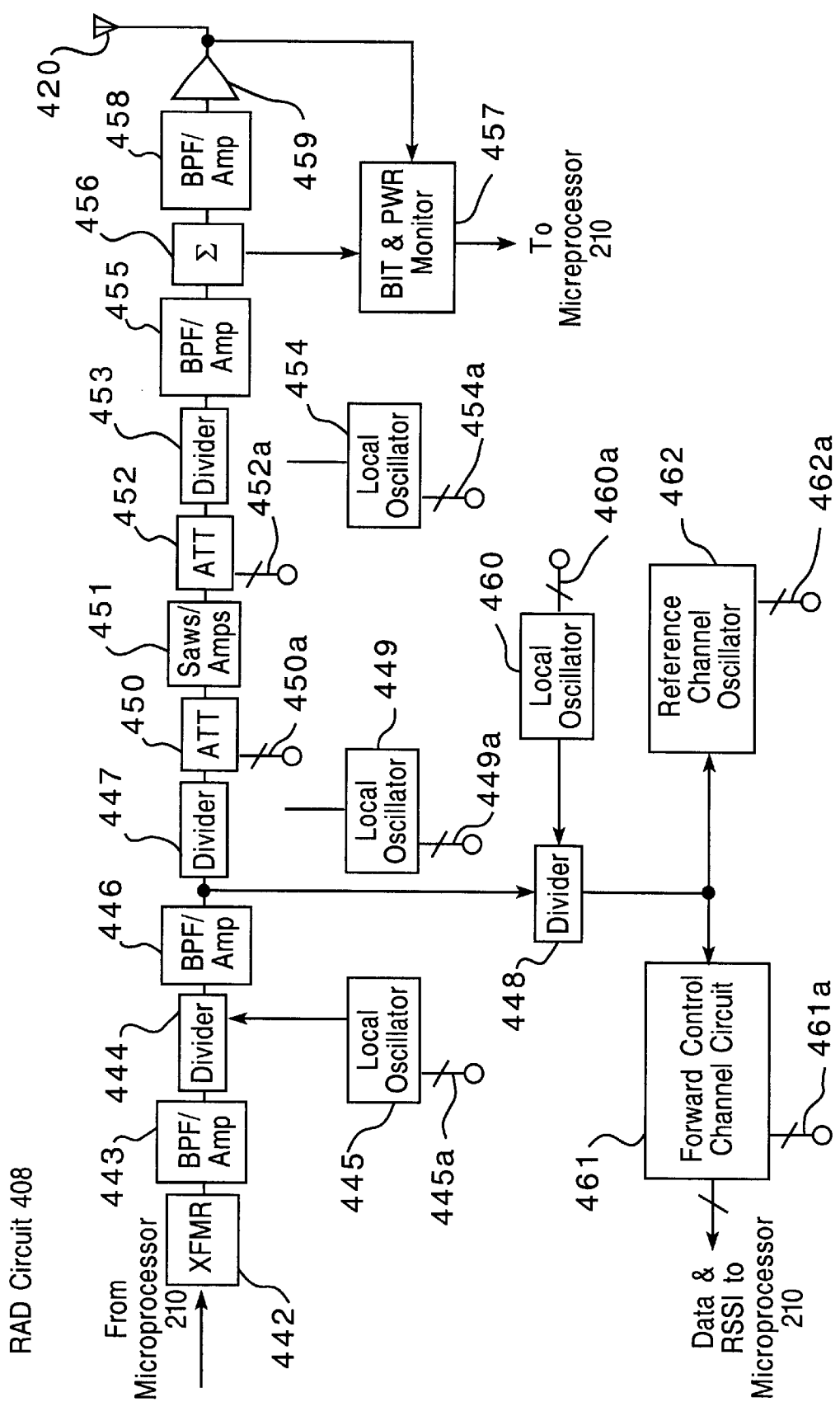
FIG. 4 is a detailed block diagram of the portion of the remote transceiver that receives telephony signals from wireless telephones and forwards them via the broadband distribution network to the central transceiver, base transceiver station, and telephone network.

In FIG. 4 is shown a detailed block diagram of circuit 408 in RAD 118 that carries telephony signals originating at RASP 117 via broadband distribution network 112 and circuit 408 to wireless telephones 119 (not shown). As previously described, RAD 118 hangs from and is connected to broadband distribution network 112. Transformer 442 is an impedance matching transformer having 75 ohm primary and 50 ohm secondary windings. When broadband distribution network 112 is coaxial cable, the primary winding of transformer 442 is wired in series with the center conductor of the coaxial cable. Transformer 442 is used to connect frequency multiplexed telephony and control signals carried on broadband distribution network 112 to the input of RAD circuit 408. Only the RADs 118, the receive frequency which has been tuned to the particular frequency of telephony and control signals on broadband distribution network 112 can actually receive and forward the telephony signals to a wireless telephone 119.

All RADs 118 assigned to a sector receive control signals directed toward any one of the RADs in the sector. However, each RAD 118 has a unique address that prefixes each control signal and is used by the RAD 118 to accept only control signals directed specifically to it by RASP 117.

The frequency multiplexed telephony and control signals received by RAD circuit 408 from broadband distribution network 112 are input to band pass filter and amplifier 443. The combination of mixers 444 and 447, and filters 443, 446 and 451 are primarily used to provide filtering of the digital, spread spectrum telephony signal in accordance with the teaching of present invention.

Filter 443 passes all possible frequency multiplexed telephony and control signals that are carried on broadband distribution network 112, and excludes most other unwanted signals carried on broadband distribution network 112. Circuit 443 also amplifies the signals that pass through the filter.

The signals output from filter 443 are input to mixer 444 along with a signal from local oscillator 445. Alike the local oscillators shown in FIG. 2 and described with reference to that Figure, the frequency of local oscillator 445 is digitally controlled at its input 445a by microprocessor 210 in FIG. 2 responsive to control signals received from RASP 117.

The operation of mixer 444 results in multiple frequencies being output from the mixer as is known in the art and unwanted frequencies are blocked by band pass filter 446 which passes only desired signals. The selected set of telephony and control signals are now input to mixer 447. Alike other local oscillators in FIGS. 3 and 4, oscillator 449 is digitally controlled at its control input 449a by microprocessor 210 responsive to control signals received from RASP 117. In a manner well-known in the art, mixer 447 combines the signals input to it and provides a number of output signals at different frequencies. All these frequencies are input to an attenuator 450 which is used to adjust the gain level of the signals. Attenuator 450 is part of the gain control system and is digitally controlled at its input 450a in 1/2 dB steps by microprocessor 210, responsive to control signals received from RASP 117, alike the digitally controlled attenuator 336 in FIG. 3.

The gain adjusted signal output from attenuator 450 is input to SAW filter and amplifier 451. Due to the sharp filtering action of SAW filter 451, even spurious signals close to the desired telephony and control tone signals are removed. Control signals frequency multiplexed with the telephony signal do not pass through SAW filter 451. Instead, the control signals are input to mixer 448 as is described further in this specification.

The telephony signals passed through SAW filter 451 are input to digitally controlled attenuator 452 to adjust the gain level of the signal before it is input to mixer 453 along with the output of digitally controlled local oscillator 454. Attenuator 452 is part of the gain control system and is digitally controlled at its control input 452a in 2 dB steps by microprocessor 210, responsive to control signals received from RASP 117.

The amplitude adjusted telephony signal output from attenuator 452 is input to mixer 453 along with a signal from digitally controlled 454a oscillator 454. Oscillator 454 is controlled by microprocessor 210, responsive to control signals received from RASP 117, in the same manner as local oscillators 445 and 449. Mixer 453 combines the two signals in a manner well-known in the art to produce several output signals, one of which is the telephony signal now having the desired carrier frequency for transmission of the communications signal to a remote wireless telephone 119. The signals output from mixer 453 are input to band pass filter and amplifier 455. Band pass filter 455 passes only the desired carrier frequency. The signal is also amplified before being input to signal divider 456.

A portion of the telephony signal input to divider 456 is divided and input to bit and power monitor 457, while the remainder of the signal is input to band pass filter and amplifier 458. Bandpass filter 458 assures that there are no extraneous signals combined with the desired telephony signal, amplifies same, and applies it to power amplifier 459. Power amplifier 459 amplifies the telephony signal and couples it to transmit antenna 420. The signal is transmitted within the physical area of the cell or sector covered by this RAD 118 and is received by a remote wireless telephone 119 which is in the area covered by this RAD 118.

The telephony signal input to bandpass filter 458 is sampled by divider 456 and the sample is input to BIT and Power Monitor 457. The level of signal is reported by microprocessor 210 to RASP 117. In addition, the output of power amplifier 459 is also sampled and input to BIT and Power Monitor 457. A signal level measurement is used in concert with attenuators 450 and 452, as commanded by RASP 117, to adjust the power level of the telephony signal to be applied to transmit antenna 420. If the signal level output from power amplifier 459 is too high microprocessor will shut down this RAD 118.

A portion of the signal output from bandpass filter and amplifier 446, and still including any control signals, is input to mixer 448 along with a signal from local oscillator 460. The output of mixer 448 is input to reference channel oscillator 462 and forward control channel circuit 461. Circuit 461 accepts only control signals sent from RASP 117 and sends them to microprocessor 210. Control signals have a prefix RAD address as part of the control signals and each RAD 118 has a unique address. Therefore, microprocessor 210 in each RAD 118 can recognize and accept only control signals directed to it.

When a RAD 118 receives control signals directed to it, microprocessor 210 responds thereto to perform the action required by RASP 117. The control signal may ask for the settings of the local oscillators and attenuators, and this information is returned to RASP 117 using control signal oscillator 338 as previously described. The control signal from RASP 117 may also indicate revised settings for local oscillators and attenuators. Microprocessor 210 makes the required changes and then sends a confirmation signal back to RASP 117 indicating that the requested changes have been made. As part of the gain control operation the control signal from RASP 117 may also request information concerning the outputs from bit and power monitors 341 and 457, and request that the output from gain tone oscillator 342 be added to the telephony communications signals. Responsive to any of these control signals, microprocessor 210 performs the requests.

Reference channel oscillator 462 processes the output of mixer 448 to generate a phase lock loop reference signal that is used to provide a master frequency to all local oscillators within all RAD 118s to match their frequency of operation with RASP 117.

Having considered the design and operation of a RASP 117 and a RAD 118 in a wireless telephony system, the following will next consider the means by which the operation of RASPs 117 and RADs 118 are monitored and controlled and, in particular, the presently preferred embodiment of the means by which commands and monitored data are encoded and communicated over the network.

Figure 5:
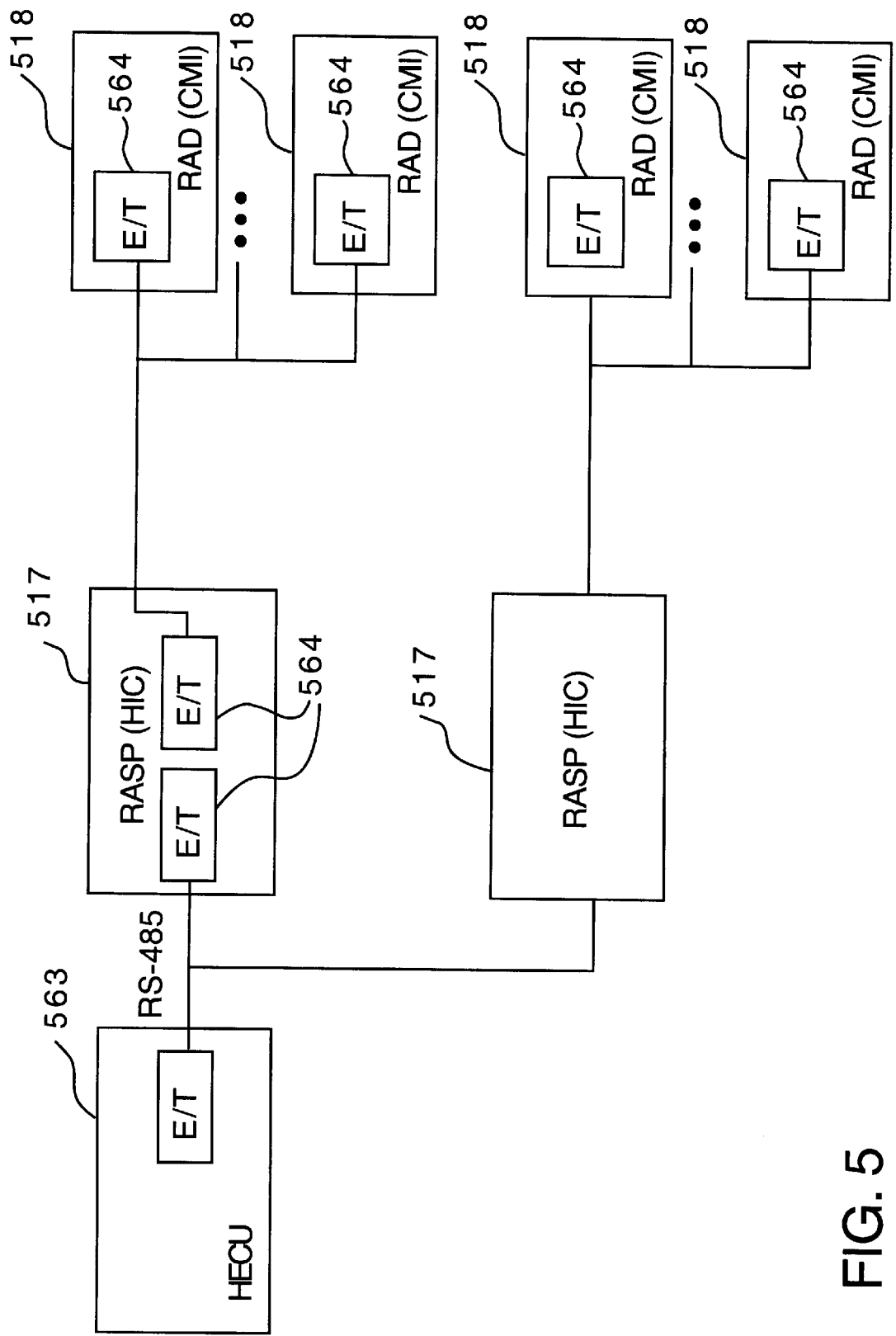
FIG. 5 is a block diagram of a typical network showing a base transceiver station and a plurality of remote antenna signal processors (RASPs), each of which is associated with one of a plurality of remote antenna drivers (RADs), wherein the base transceiver station includes a head end control unit and monitoring/command communications are through network communications Encoder/Transceiver (E/T)s.

Referring first to FIG. 5, therein is illustrated a generalized block diagram of a wireless telephony system integrated with a broadband distribution network according to a presently preferred embodiment of the present invention. As shown therein, the system will include at least one Head End Control Unit (HECU) 563 which may be implemented, for example, by program control in a computer, and which receives and monitors data from RASPs 517 and RADs 518 representing the states of operation of these elements of the wireless telephone system, and which generates and transmits commands to RASPs 517 and RADs 518 controlling their operation. As indicated, HECU 563, which is part of Base Transceiver Station 115, includes an Encoder/Transceiver (E/T) 564 that communicates monitored data and commands between the HECU 563 and the RASPs 517 and RADs 518 through the broadband distribution network 112. In the presently preferred embodiment of the invention, Encoder/Transceiver (E/T) 564 may be, for example, a commercially available LONWorks neuron circuit which executes a communications protocol similar to the ethernet protocol.

The physical connection between the HECU 563 and RASPs 517 may be, for example, a RS-485 link, as is well known to those of skill in the relevant arts.

As also shown in FIG. 5, the HECU 563 may be connected to one or a plurality of RASPs 517, each of which may in turn be connected to one or a plurality of RADs 518. As indicated in FIG. 5, each RASP 517 will include a first Encoder/Transceiver (E/T) 564 for communicating with the HECU 563 and a second Encoder/Transceiver (E/T) 564 for communicating with the RADs 518 associated with the RASP 517. As indicated in a single, exemplary one of the RADs 518 of FIG. 5, each RAD 518 will, in turn, include an Encoder/Transceiver (E/T) 564 connected between the RAD 518 receive and transmit circuits 508 and 509 and the RAD Microprocessor 210 for communicating between the RAD microprocessor 210 and the associated RASP 517. As indicated in FIG. 5, the communications links between a RASP 517 and the associated RADs 518 may also include a RS-232 link directly between the RASP 517 and one or more of the RAD microprocessors 210, which does not require the use of Encoders/Transceivers 564.

As has been discussed, the control and monitoring of a large network containing a large number of remote antenna drivers (RADs) and remote antenna signal processors (RASPs) requires a flexible and reliable means for encoding and communicating data and commands to be received from and transmitted to the remote antenna signal processors (RASPs) and the remote antenna drivers (RADs). It is necessary for the encoding means to convey data and commands in as flexible and compact a form as possible to preserve communications bandwidth and thereby to allow a large number of remote antenna drivers (RADs) to be monitored and controlled from each base transceiver station 115, and it is preferable that the encoding allow a flexible a network configuration as possible.

As described previously, a primary function of each RASP 517 is to act as an intermediary for communications between a HECU 563 and the RADs 518 connected to the RASP 517, for which purpose the RASP 517 passes command information from the HECU 563 to the RADs 518 connected to the RASP 517 and collects status information from the RADs 518. A second primary function of a RASP 517 is to control the RADs 518 connected to the RASP 517, such as tuning the RAD 518 transmitting and receiving frequencies, controlling the attenuation levels of the telephony signals and collecting and maintaining operational status information.

The monitoring and command communications and encoding system of the present invention accommodates two forms of communications traffic in order to perform the above described functions, wherein the two forms of traffic result from the types of communications between a HECU 563, the RASPs 517, and the RADs 518 and the resulting concentration patterns of telephony signals in the system. That is, the HECU 563 communicates not only with the RASPs 517, but also with each of the RADs 518. Each RASP 517, however, is generally a communications node for a plurality of RADs 518, that is, monitors and controls a plurality of RADs 518 as well as operating as a relay and concentration point for communications between the HECU 563 and the RADs 518 connected to RASP 517.

As such, there is a first traffic pattern of infrequent but high volume of command and control communications between the HECU 563 and each individual RASP 517, comprising, for each RASP 517, communications between the HECU 563 and the RASP 517 and communications between the HECU 563 and the RADs 518 that are relayed through the RASP 517. Each exchange of command and control communications traffic between a HECU 563 and a RASP 177 may comprise a relatively high volume of traffic with a given RASP 517 and an exchange between a HECU 563 and a RASP 517 will typically complete all current outstanding communications with that RASP 517. Such an exchange will usually be comprised of a sequence of messages exchanges, such as a command message from the HECU 563 to the RASP and a return message, such as an acknowledgment or reply or response from the RASP 517 to the HECU 563. The HECU 563 will then switch to another RASP 517 and repeat the process, and so on. The command and control communications between a HECU 563 and a RASP 517 will thereby typically be of the form of a completed exchange of transmissions and replies between the HECU 563 and the RASP 517 before the HECU 563 begins communication with the next RASP 517.

There is a second traffic pattern between each RASP 517 and the RADs 518 connected to the RASP 517, however, comprised of commands and monitoring data messages exchanged between the RASP 518 and the RADs 518 connected from the RASP 517 and messages between the HECU 563 to the individual RADs 518, for which the RASP 517 operates as a relay node. Accordingly, the total volume of communication traffic between a RASP 517 and the associated RADs 518 may be relatively greater. Each RASP 517 will typically exchange a relatively small volume of messages with each RAD 518, such as a sequence of commands, before switching to a next RAD 518 to issue a sequence of commands, and so on, and will return to each RAD 518 at a later time to receive the replies, acknowledgments ,or responses to the initial commands.

Finally in this regard, it will be noted that the variety of messages that must be exchanged between the HECU 563, RASPs 517 and RADs 518 is, by the nature of the wireless telephony system, relatively limited, being essentially restricted to commands and replies to commands. As such, the messages are encoded in the form of a relative compact unique code for each message, together with such associated data as is necessary to fully specify a command. A command issued by a RASP 517, for example, may include a code directing a RAD attenuator setting together with data representing the value to which the attenuator is to be set, or a code identifying monitored data, such as a signal level, together with data representing the measured value of the signal level.

Figure 6:
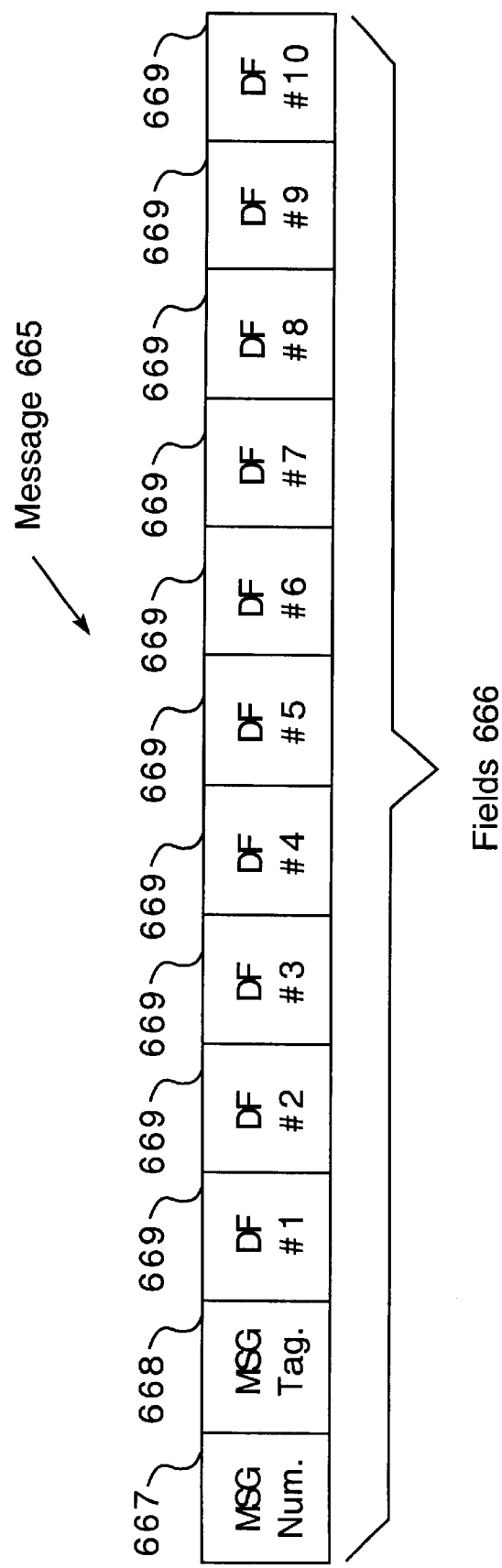
FIG. 6 is a diagrammatic illustration of a message format used for encoding commands and monitored data according to the present invention.

Referring now to FIG. 6, therein is illustrated a message as exchanged between HECUs 563, RASPs 517 and RADs 518 according to the present invention. As shown therein, a Message 665 includes twelve Fields 666 which, in turn, are comprised of a Message Number (MSG. Num.) 667 field, a Message Tag (MSG Tag) 668 field and a plurality of Data Fields (DFs) 669, which are represented in the presently preferred embodiment by 10 data fields indicated as DFs 669 #1 through DF 669 #10). In the presently preferred embodiment, each Field 666 contains one byte, that is, 8 bits, of information.

The MSG Number 667 field contains a numeric value, for example, a hexadecimal number, representing the meaning of the message, such as "message failed", "set up downstream attenuators and power control" or "read frequency status". The presently preferred embodiment of the monitoring and command communications and encoding system of the present invention provides fifty-three messages, that is, defines fifty-three different, unique message codes that may appear in a MSG Number 667 field, each of which is defined in Appendix A.

The MSG Tag 668 field of a Message 665, in turn, contains a numeric value that is assigned to a given message for the purpose of identifying that message out of a sequence of messages. As described above, the MSG Tag 668 field of a Message 563 contains eight bits and is therefore capable of uniquely identifying each Message 563 in a sequence of two-hundred fifty-six messages, whereupon, in the present embodiment of the invention, the system returns to the beginning of the sequence and repeats the sequence, and so on.

As has been described above, a communication exchange between a HECU 563 and a RASPs 517 in the presently preferred embodiment will complete all current outstanding communications with that RASP 517 and will be of the form of a completed exchange of transmissions and replies between the HECU 563 and the RASP 517 before the HECU 563 begins communication with a next RASP 517. It is therefore not necessary to track the individual messages exchanged between a HECU 563 and the RASPs 517 as each exchange of one or more messages between a HECU 563 and a RASP 517 will be sequential and complete and, as such, the MSG Tag 668 field is not used, that is, is essentially ignored, in communications between a HECU 563 and the RASPs 517.

As has also been described above, however, each RASP 517 will typically exchange a relatively small volume of messages with each RAD 518, such as a sequence of commands, before switching to a next RAD 518 to issue a sequence of commands, and so on, and will return to the RADs 518 at a later time to receive the replies, acknowledgments or responses to the initial commands. As such, a transmission of messages between a RASP 517 and a RAD 518 will typically be partial and the messages sent to or received from a RAD 518 by a RASP 517 will be interspersed with messages sent to or received from one or more other RADs 518. As such, the MSG Tag 668 field is used for communications between a RASP 517 and its associated RADs 518 in order to track and coordinate the messages sent to or received from each RAD 518.

The DFs 669, in turn, contain numeric or alphanumeric data pertaining to the meaning of the message, such as the reason for a message failing, the identification of a RAD 518 whose downstream attenuators and power levels are to be set and the settings for the attenuators and power levels, or a command for a RAD 518 or RASP 517 to report upon operating parameters identified in the message.

The possible range of messages, uses, and content of DFs 669 are illustrated in FIGS. 7A through 7H. For example, FIG. 7A is a tabulation of the fifty-three messages implemented in the presently preferred embodiment of the invention, the left hand column of which expresses the fifty-three different hexadecimal numbers that may appear in the MSG Number 767 field of a Message 563 to identify the meaning or contents of a message. FIG. 7B, in turn, is MSG Number 0×00, that is, message "0", which is a response only message identifying that a message failed to be processed by the intended recipient of the message and expressing, in the DF 769 fields of the message, the reason for the failure.

FIGS. 7C, 7D and 7E are messages transmitted to RASPs 517, identified in the messages as "HICs", by a HECU 563 to respectively set or change the RASP 117's state and channel parameters, to set the RASP 117's downstream attenuators and power control, and to set the RASP 117's upstream attenuators and power control.

FIG. 7F is a message transmitted to a RASP 517, at the installation of a new RAD 518,and illustrates the loading of an identification code for the new RAD 518, identified as a "Neuron ID", into a database in the RASP 517. In this regard, it should be noted that, as described previously, the present implementation of the system uses Neuron circuits for communication between HECU 563, RASPs 517, and RADs 518, and that each HECU 563, RASP 517 and RAD 518 thereby contains a Neuron circuit. Each HECU 563, RASP 517, or RAD 518 is thereby identified and addressed, for example, as the intended recipient of a Message 563, by the corresponding stored Neuron Chip identification code, or "Neuron ID".

FIG. 7G illustrates a message used at installation of a RAD 118, and subsequently to initialize, and change the state, frequencies and other parameters of the RAD 518, also referred to as a "CMI", as may be seen from the contents defined for the DF 769 fields. It will be noted that this message, as would be typical for a message to a RAD 518, contains a message tag (0–255) in MSG Tag 768 field and an identification (Neuron ID) of the RAD 518 intended as the recipient of the message in the form of a Sector Number and a CMI Number, forming a Neuron ID, in DF 769 field #2.

Finally, FIG. 7H illustrates a message used to control the gain settings of RASPs 517 and RADs 518.

In conclusion, while the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. Therefore, it is the object of the appended claims to cover all such variation and modifications of the invention as come within the true spirit and scope of the invention.

What is claimed is:

1. In a wireless telephone system including a plurality of remotely located transceivers for transmitting and receiving telephony signals to and from wireless telephones, each of the plurality of remote transceivers being connected to a broadband distribution network that carries the telephony signals between the remote transceivers and a central location, the central location including at least one remote antenna signal processor connected to the broadband distribution network and a control unit connected to the at least one remote antenna signal processor, a monitoring and command system for controlling operations of the at least one remote antenna signal processor and all the remote transceivers, said monitoring and command system comprising:

the control unit for exchanging messages with said at least one remote antenna signal processor and all of said remote transceivers for monitoring and controlling their operations, wherein each exchange of messages between the control unit and said at least one remote antenna signal processor comprises a completed exchange of messages between the control unit and said at least one remote antenna signal processor before initiation of an exchange of messages between the control unit and another remote antenna signal processor, and the at least one remote antenna signal processor for exchanging messages with each of the plurality of remote transceivers for monitoring and controlling operations of each of the remote transceivers, and for relaying messages between the control unit and each of the remote transceivers, wherein the messages of an exchange of messages between the at least one remote antenna signal processor and a selected one of the remote transceivers being interspersed with the messages of an exchange of messages between the at least one remote antenna signal processor and others of the remote transceivers, wherein the messages exchanged among the control unit, the at least one remote antenna signal processor, and the remote transceivers includes;

a message number field containing a value identifying the meaning of the message, a message tag field containing a value identifying a given message in a sequence of messages, wherein the message tag field is used in an exchange of messages between the at least one remote antenna signal processor and each of the remote transceivers, and a plurality of data fields containing message information wherein the contents of each data field are defined by the contents of the message number field.

2. The monitoring and command system of claim 1 wherein the data fields contain information comprising:

an identification of a remote transceiver intended as a recipient of a message.

3. The monitoring and command system of claim 1 wherein the data fields contain information comprising:

information determining the operating parameters of the remote transceivers.

4. The monitoring and command system of claim 1 wherein the data fields contain information comprising:

information pertaining to the status and operation of the remote transceivers.

\* \* \* \* \*